United States Patent [19]

Muramatsu

[11] Patent Number: 5,125,283
[45] Date of Patent: Jun. 30, 1992

[54] SPEED GOVERNOR

[75] Inventor: Kenji Muramatsu, Nagano, Japan

[73] Assignee: K.K. Sankyo Seiki Seisakusho, Nagano, Japan

[21] Appl. No.: 734,648

[22] Filed: Jul. 23, 1991

[30] Foreign Application Priority Data

Aug. 10, 1990 [JP] Japan .................. 2-84615[U]

[51] Int. Cl.$^5$ .................. F16H 57/10; H02K 49/00
[52] U.S. Cl. .................. 74/411.5; 310/93; 310/99; 310/105
[58] Field of Search .............. 310/93, 105, 90, 99; 188/267; 192/84 E, 110 B; 74/411.5

[56] References Cited

U.S. PATENT DOCUMENTS

| | | | |
|---|---|---|---|
| 3,555,321 | 1/1971 | Gruener et al. | 310/93 |
| 4,181,867 | 1/1980 | Muller | 310/90 X |
| 4,601,439 | 7/1986 | Moosberg | 310/93 X |
| 4,612,469 | 9/1986 | Muramatsu | 310/93 |
| 4,940,194 | 7/1990 | Young | 310/93 X |

FOREIGN PATENT DOCUMENTS 61-19808 2/1986 Japan .

*Primary Examiner*—Rodney H. Bonck
*Attorney, Agent, or Firm*—Sughrue, Mion, Zinn Macpeak & Seas

[57] ABSTRACT

A speed governor comprises a speed increasing wheel train and an electroconductive plate confronting a magnet, the electroconductive plate integrally formed with the final stage of the speed increasing wheel train, a disk-like yoke, a cup-like yoke, abutted against the disk-like yoke, enclosing the electroconductive plate, a magnet fixed on one of the disk-like yoke and the cup-like yoke, and a plurality of inclined surfaces formed on a circumferential end surface of the cup-like yoke, each of the plurality of inclined surfaces identical with each other, each of the plurality of inclined surfaces abutted against a projection of the disk-like yoke whereby one of the disk-like yoke and the cup-like yoke can be moved in a circumferential direction.

7 Claims, 2 Drawing Sheets

SPEED GOVERNOR

BACKGROUND OF THE INVENTION

This invention relates to a speed governor for adjusting the speed of an input rotation by causing a braking force to act upon the input rotation by eddy current of an electroconductive plate.

An apparatus disclosed in Japanese Utility Model Unexamined Publication No. 19808/1986 has a construction wherein a magnetic circuit is constituted by a copper disk mounted on the final stage of a speed increasing wheel train, and lo multipolarized permanent magnets are arranged so as to have the copper disk therebetween. A magnetic force is applied to the copper disk during its rotation to cause a braking force to be generated by eddy current of the copper disk.

The braking force is changed by rotating the permanent magnets radially and thereby varying the magnetic flux density between the upper and lower permanent magnets.

In the above construction, two or more magnets are necessary, which is costly. In addition, the braking force of the permanent magnets comes in two levels, which, due to variations in the magnetization of the permanent magnets and in other mechanical parts, causes large variations in its performance. Further, the two-level adjustment does not permit fine adjustment, limiting the scope of application of the device.

Moreover, the attracting force of each permanent magnet is strong for the small size of the case, and when the permanent magnets are rotated in the radial direction, it is difficult to maintain a coercive force for locking excessive rotation after their rotation.

SUMMARY OF THE INVENTION

Therefore, an object of the present invention is to provide a speed governor which uses a single magnet to reduce its fabrication cost and which allows fine adjustment of the lo braking force to stabilize its speed adjusting performance.

To achieve the above object, the device is applied to a speed governor which accommodates, within a case, a speed increasing wheel train and an electroconductive plate confronting a magnet. The speed governor also includes a disk-like yoke, and a cup-like yoke which encloses the electroconductive plate and is abutted against the disk-like yoke. The magnet is fixed on either the disk-like yoke or the cup-like yoke. A plurality of inclined surfaces are provided on the circumferential end surface of the cup-like yoke, each inclined surface being identical in shape with each other and being abutted against a corresponding projection arranged on the disk-like yoke. These two yokes are rotated relatively and circumferentially so that the distance between the magnet and the electroconductive plate can be adjusted steplessly.

Here, one of the yokes can be biased onto the other yoke by the biasing force of a spring if necessary so as to allow the distance between the magnet and the electroconductive plate to be adjusted at any stage after its fabrication. However, if no adjustment of the braking force is necessary after the adjustment during fabrication, both yokes are locked for rotation by an adhesive or other appropriate fixing means.

The speed increasing wheel train rotates the electroconductive plate at its final stage upon reception of an input rotation which is to be controlled. At this time, eddy current is generated on the electroconductive plate by the magnetic flux of the magnet, thereby applying a braking force to the electroconductive plate. As a result, the speed of the input rotation is adjusted.

Here, the braking force applied to the electroconductive plate can be adjusted by rotating one of the yokes relative to the other yoke along the inclined surfaces in the circumferential direction. That is, the two yokes are rotated relative to each other along the inclined surfaces in the circumferential direction, so that the distance between the two yokes is varied, which increases or decreases the distance between the magnet and the electroconductive plate. As a result, the intensity of the eddy current is varied, thereby allowing the braking force to be adjusted.

DETAILED DESCRIPTION OF THE PREFERRED EMBODIMENTS

Figure 1:
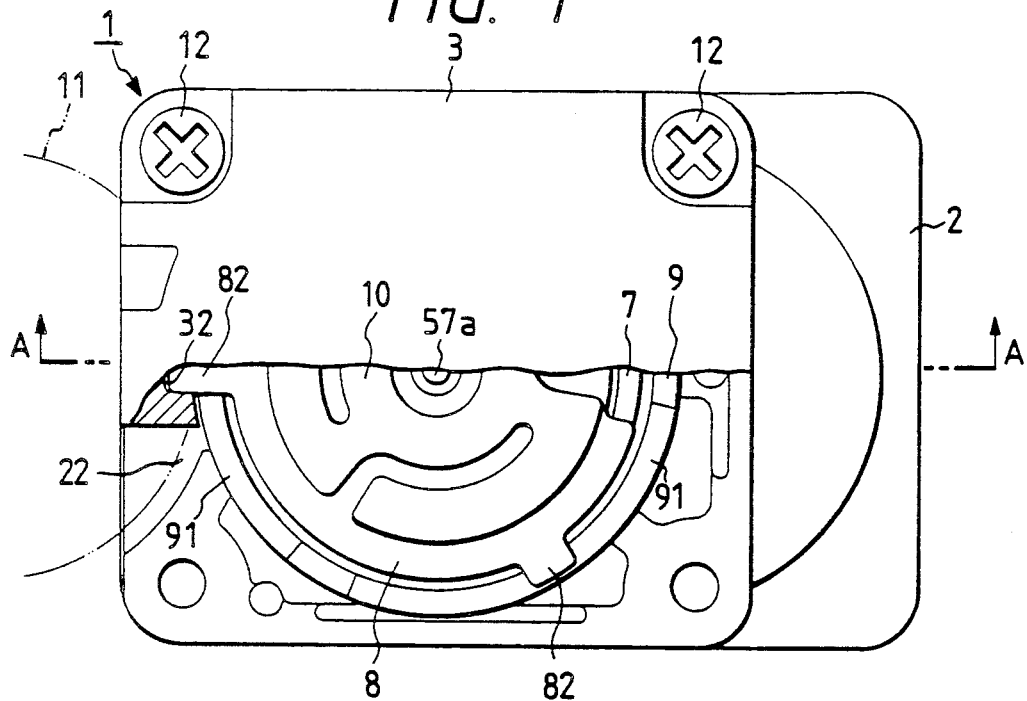
FIG. 1 is a partially cutaway plan view of one embodiment of speed governor according to the present invention.
Figure 2:
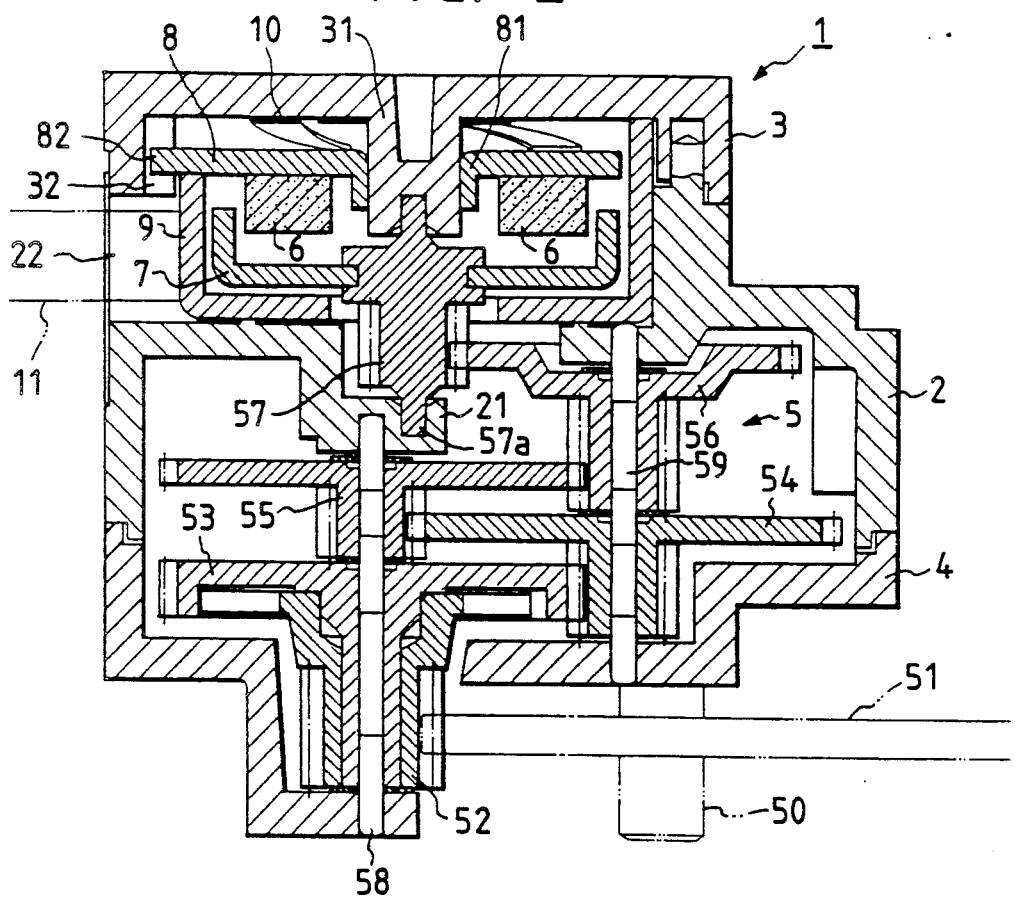
FIG. 2 is a vertical sectional view taken along a line A—A of FIG. 1.
Figure 3:
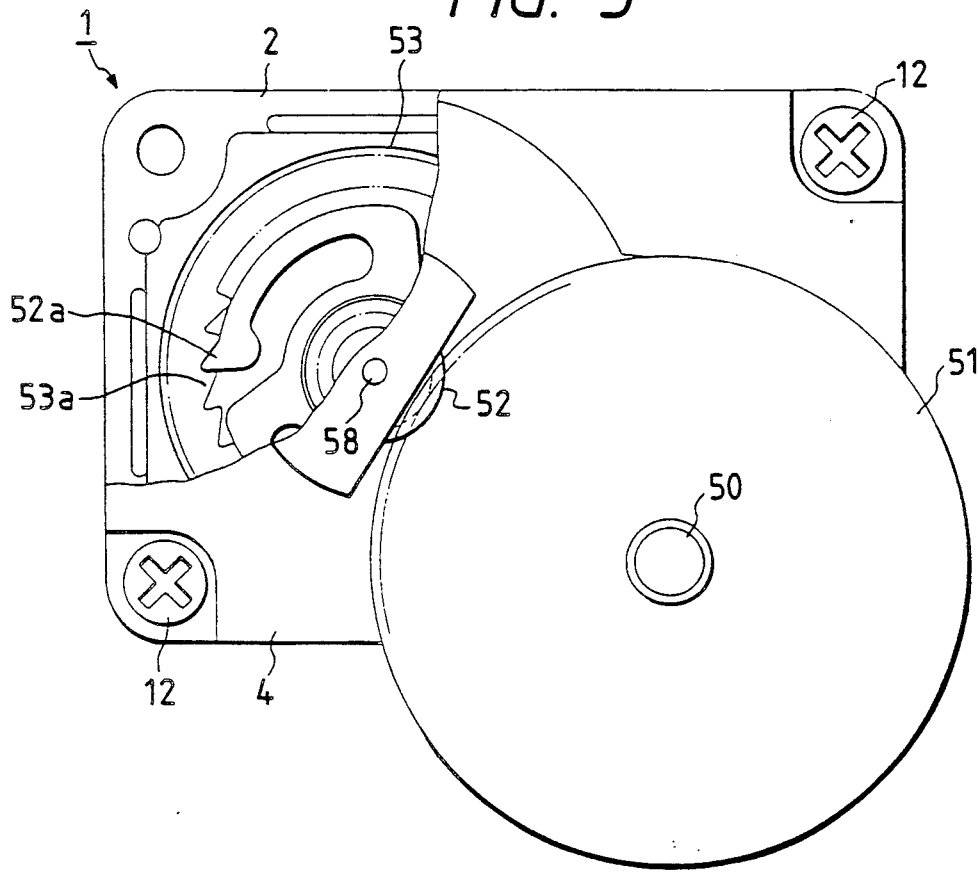
FIG. 3 is a partially cutaway bottom view of the speed governor.
Figure 4:
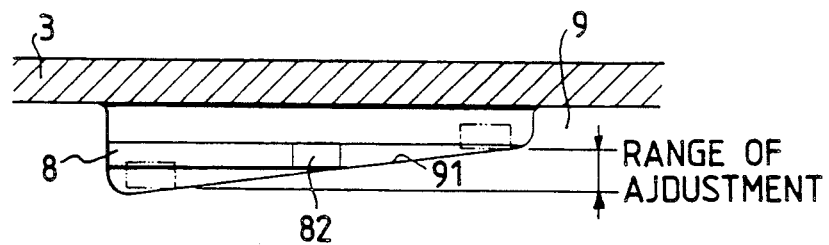
FIG. 4 is a development view of an inclined surface.

The present invention will now be described in more detail with reference to the accompanying drawings.

FIGS. 1 to 5 show the construction of a speed governor 1 of the present invention.

This speed governor 1 contains a speed increasing wheel train 5 and an electroconductive plate 7 confronting a magnet 6 inside a middle case 2 and lid-like cases 3, 4 covering the openings of the case 2. The cases 2, 3, 4 are assembled with screws 12 at their corners.

The speed increasing wheel train 5 is made up of a rachet gear 52 interposed between the cases 2, 4, a first gear 53, a composite type second gear 54, a composite type third gear 55, a composite type fourth gear 56, and a final stage pinion 57. These gears are supported by parallelly extending gear shafts 58, 59 which are press-fit between the cases 2, 4 and meshed at the time speeds are being increased. The final stage pinion 57 is rotatably supported by a pinion shaft 57a between a bearing section 21 of the case 2 and a bearing section 31 of the case 3. The pinion shaft 57a is unitized with the pinion 57.

An input rotation which is to be controlled is received by the rachet gear 52 through an input gear 51 which is rotatably supported with respect to an input shaft 50 formed in the case 4. The racket gear 52 has a racket pawl 52a as an integral part thereof and the tip of the pawl 52a is arranged so as to confront the internal gear type rachet wheel 53a which is integral with the first gear 53. Therefore, it is so arranged that it is only a rotation of the input gear 51 in one direction that is received by the speed increasing wheel train 5, and that the rotation in the reverse direction is not transmitted to the speed increasing wheel train 5 by slips between the rachet pawl 52a and the rachet wheel 53a.

The electroconductive plate 7 is, e.g., a cup-like electroconductive body, and is attached to the pinion 57 so as to lock its rotation, and positions between a disk-like magnetic yoke 8 with the magnet 6 fixed thereto and the cup-like magnetic yoke 9. While the magnet 6 is multipolarized in the axial direction and has a tubular shape, its shape is not limited to this; segmented magnets may be arranged along the circumference of the yoke. The cup-like yoke 9 is accommodated in a recessed portion of the case 2 so that the yoke 9 is rotatable around the centerline of the pinion 57. Further, the disk-like yoke 8 is movable relative to the bearing section 31 by slips of a center tube 81 in the direction of the center line, the bearing section 31 being disposed on the same center line as that of the pinion 57 at a center hole, and is biased toward the yoke 9 by a spring 10 interposed between the yoke 8 and the case 3.

The yoke 9 includes a plurality of inclined surfaces 91, e.g., three, of the same shape on the circumferential end surface by notching. Each inclined surface 91 extends with a central angle of about 105 degrees with respect to the center, and the angle of inclination of each inclined surface is about 5 to 15 degrees in the circumferential direction. In contrast thereto, the disk-like yoke 8 has three projections 82 on its outer periphery, and each projection 82 is abutted against the inclined surface 91. One of the projections 82 is formed longer than the others. Facing the interior of a rotation locking guide 32 formed inside the case 3, this long projection 82 serves to lock the rotation of the yoke 8 in the circumferential direction. Part of the outer peripheral surface of the yoke 9 confronts an opening 22 formed in the case 2, and is in frictional contact with the outer periphery of an operation roller 11, so that the yoke 9 can rotate. Accordingly, the magnet 6 and the yokes 8, 9 constitute a magnetic circuit for causing magnetic flux to act on the electroconductive plate 7.

When the input gear 51 is rotated, its rotating force is transmitted to the final stage pinion 57 and then to the electroconductive plate 7 which is integral therewith through the rachet gear 52, the first gear 53, the second gear 54, the third gear 55, the fourth gear 56 serving as the speed increasing wheel train 5.

When the electroconductive plate 7 rotates, eddy current is generated on the electroconductive plate 7 by the changing magnetic field, because the magnetic flux acts between the magnet 6 and the yoke 9. The magnetic flux of the eddy current interacts with that of the magnet 6 to apply a braking force into the rotating force of the input gear 51. As a result, the rotating force of the input gear 51 is subjected to speed adjustment within a predetermined delay time, and stopped at a predetermined timing.

Here, the braking force is adjusted in the following way. For example, the operation roller 11 is driven by an external source in either direction, the cup-like yoke 9 is rotated in a predetermined direction within the cases 2, 3. At this time, the disk-like yoke 8 has its rotation locked by the rotation locking guide 32 and is biased toward the cup-like yoke 9 by the spring 10. As a result, each inclined surface 91 of the yoke 9 serves as a confronting cam, moving the yoke 8 in the direction of center line of the bearing section 31 through each projection 82 serving as a cam follower. As a result, the magnet 6 moves within a range of adjustment together with the yoke 8, changing the distance of confrontation between the magnet 6 and the cup-like yoke 9, i.e., a magnetic air gap, steplessly.

A small distance between the magnet 6 and the yoke 9 effects increasing the magnetic flux density at the air gap to increase a braking force so that the speed adjustment time from a brake start to a complete stop under a constant input torque is decreased. Conversely, a large distance between the magnet 6 and the yoke 9 effects decreasing the magnetic flux density at the air gap to decrease the braking force so that the speed adjustment time from a brake start to a complete stop under a constant input torque is increased.

After such adjustment, the yoke 9 is fixed by means of an adhesive or the like to the rotation-locked yoke 8.

In the above construction, the angle of inclination of each inclined surface 91 is small; only a single magnet is used; and no force deviating from the direction of rotation is generated. As a result, the yoke 9, after adjustment, is not necessarily fixed to the yoke 8, and the process of adhesively fixing the yoke 9 may be omitted if the condition after adjustment can be maintained by, e.g., a frictional engaging force between the case 2 and the yoke 9.

While the yoke 8 is fixed and the other yoke 9 is rotated in the above embodiment, it may be reversely arranged as to make the yoke 8 rotatable and the yoke 9 fixed in a manner opposite to the above embodiment, since the position of the yokes 8, 9 is adjustable as long as they rotate relative to each other.

Figure 5:
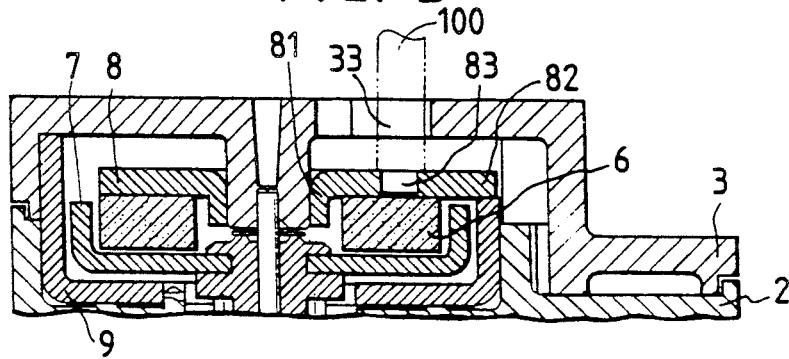
FIG. 5 is a sectional view showing a main portion of another embodiment of the speed governor according to the present invention.

Further, the following means for adjusting the relative rotation of the yokes 8, 9 may be employed. A means in which a part of the yoke 8 or 9 is protruded toward the outside from the opening 22 as an operation lever so that the yoke is rotated directly with the projected part as a handle; a means in which a spur gear or a worm is formed on the outer periphery of the yoke 8 or 9, and a pinion or a worm gear serving as a rotation adjusting member is meshed so that the shaft of the pinion or the worm is rotated; a means in which the aforesaid operation lever is adjusted by both a screw disposed tangentially with respect to the yokes 8, 9 and a feed nut engaged with the screw; or as shown in FIG. 5, a means in which the yoke 9 is fixed while the yoke 8 is made rotatable, and an adjusting shaft 100 is inserted into a hole 83 through an arcuate groove 33 and rotated in the circumferential direction, the groove 33 being concentric with the pinion shaft 57a disposed on the case 3. Further, the spring 10 may be dispensed with if there is a sufficient attracting force between the yoke and the magnet.

Further, the magnet 6 may be mounted on the cup-like yoke 9, instead of the disk-like yoke 8, so as to confront the electroconductive plate 7.

The device provides the following special advantages.

Since the magnetic circuit is formed by the magnet and the two yokes, not only the number of parts involved is reduced, but also the braking force generating section can be compactly assembled into the final stage of the speed increasing wheel train.

Since the distance of confrontation between the disk-like yoke and the cup-like yoke can be adjusted by the relative rotation between the inclined surfaces of the cup-like yoke and the corresponding projections of the disk-like yoke, the speed adjusting time not only has a wide range but also can be adjusted finely. As a result, the scope of application of the speed governor is widened.

Since the braking force is varied largely with a small change in the air gap between the magnet and the confronting yoke, the speed adjusting range is large even with a single magnet. As a result, the scope of utilization can be significantly increased also from this viewpoint.

What is claimed is:

1. A speed governor having a speed increasing wheel train and an electroconductive plate confronting a magnet, said electroconductive plate integrally formed with the final stage of said speed increasing wheel train, said speed governor comprising:
   a disk-like yoke;
   a cup-like yoke, abutted against said disk-like yoke, enclosing said electroconductive plate;
   a magnet fixed on one of said disk-like yoke and said cup-like yoke; and
   a plurailty of inclined surfaces being formed on a circumferential end surface of said cup-like yoke, each of said plurality of inclined surfaces being identical with each other, each of said plurality of inclined surfaces abutted against a projection of said disk-like yoke whereby relative circumferential movement of said disk-like yoke and said cup-like yoke will cause a circumferential movement of said disk-like yoke and said cup-like yoke will cause a change in the distance between said magnet and said electroconductive plate.

2. A speed governor as claimed in claim 1, further comprising:
   a spring pressing one of said yokes to the other yoke.

3. A speed governor as claimed in claim 1, further comprising;
   adjusting means for moving one of said yokes in said circumferential direction thereof.

4. A speed governor as claimed in claim 3, wherein said means includes an outer peripheral surface of one of said yokes and a rotary member frictionally contacted with said outer peripheral surface.

5. A speed governor as claimed in claim 3, wherein said means includes an operation lever, integrally formed with one of said yokes, protruding from a case of said speed governor.

6. A speed governor according to claim 3, wherein said means includes a rotation transmitting section disposed on an outer peripheral portion of one of said yokes and a rotation adjusting member, having an engageable portion at an outer peripheral thereof, rotatably coupled with said rotation transmitting section.

7. A speed governor according to claim 3, wherein said means includes, an engageable portion disposed on one of said yokes and a rotation adjusting member movable in said circumferential direction engaged with said engageable portion.

* * * * *